United States Patent
Lee (10) Patent No.: US 11,592,078 B2
(45) Date of Patent: Feb. 28, 2023

(54) DAMPER ASSEMBLY FOR TORQUE CONVERTERS

(71) Applicant: VALEO KAPEC CO., LTD., Daegu (KR)

(72) Inventor: Kyungryol Lee, Auburn Hills, MI (US)

(73) Assignee: VALEO KAPEC CO., LTD., Daegu (KR)

( * ) Notice: Subject to any disclaimer, the term of this patent is extended or adjusted under 35 U.S.C. 154(b) by 0 days.

(21) Appl. No.: 17/355,303

(22) Filed: Jun. 23, 2021

(65) Prior Publication Data

US 2022/0412434 A1 Dec. 29, 2022

(51) Int. Cl.
*F16F 15/123* (2006.01)
*F16F 3/06* (2006.01)
*F16H 45/02* (2006.01)

(52) U.S. Cl.
CPC .......... *F16F 15/12346* (2013.01); *F16F 3/06* (2013.01); *F16F 15/1234* (2013.01); *F16F 2230/0005* (2013.01); *F16F 2230/0052* (2013.01); *F16F 2232/02* (2013.01); *F16F 2238/026* (2013.01); *F16H 2045/0221* (2013.01)

(58) Field of Classification Search
CPC ..... F16F 15/1234; F16F 15/12346; F16F 3/06
See application file for complete search history.

(56) References Cited

U.S. PATENT DOCUMENTS

| 4,987,980 A * | 1/1991 | Fujimoto | F16H 45/02 192/213.1 |
| 5,020,647 A * | 6/1991 | Fujimoto | F16F 15/1234 192/3.33 |
| 2001/0052443 A1 | 12/2001 | Tomiyama et al. | |
| 2008/0237950 A1* | 10/2008 | Oono | F16F 15/12326 267/140.12 |
| 2009/0088261 A1* | 4/2009 | Clark | F16F 15/12346 464/68.1 |
| 2012/0152678 A1 | 6/2012 | Samie et al. | |

(Continued)

FOREIGN PATENT DOCUMENTS

| DE | 102014206157 A1 * | 10/2014 | ............... F16F 1/125 |
| EP | 3699454 A1 * | 8/2020 | ............... F16D 3/12 |

(Continued)

OTHER PUBLICATIONS

International Search Report and Written Opinion dated Jul. 21, 2022 in PCT/KR2022/004815, 8 pages.

*Primary Examiner* — Vishal R Sahni
(74) *Attorney, Agent, or Firm* — Oblon, McClelland, Maier & Neustadt, L.L.P.

(57) ABSTRACT

A damper for a torque converter is disclosed. The damper includes an outer spring and an inner spring coaxial with the outer spring; and a retaining plate to retain the outer spring and the inner spring. The retaining plate includes an upper spring guide, a lower spring guide, an outer spring support, and an inner spring support, wherein the upper spring guide extends substantially around an outer periphery of the retaining plate, the lower spring guide extends around an inner periphery of the retaining plate, the outer spring support directly contacts axial ends of the outer spring and the inner spring, and the inner spring support directly contacts the axial ends of the outer spring and the inner spring.

9 Claims, 7 Drawing Sheets

(56) References Cited

U.S. PATENT DOCUMENTS

| | | | | |
|---|---|---|---|---|
| 2012/0190462 A1* | 7/2012 | Wahl | ............ | F16F 15/1234 |
| | | | | 464/68.1 |
| 2016/0138699 A1* | 5/2016 | Dell | ............ | F16F 1/12 |
| | | | | 267/168 |
| 2017/0227085 A1* | 8/2017 | Iida | ............ | F16F 15/12326 |

FOREIGN PATENT DOCUMENTS

| | | | |
|---|---|---|---|
| ES | 2791064 T3 * | 10/2020 | ............ F16D 13/64 |
| JP | 2002-48218 A | 2/2002 | |
| JP | 2002-81522 A | 3/2002 | |
| KR | 10-2020-0074685 A | 6/2020 | |

* cited by examiner

FIG. 7

DAMPER ASSEMBLY FOR TORQUE CONVERTERS

FIELD OF THE DISCLOSURE

This disclosure relates generally to torque converters and, more particularly, to improve a damper assembly in the torque converters.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Conventionally, a damper assembly of a torque converter includes a plurality of springs and a retaining plate to support both ends of the springs. This retaining plate has extruded supports that contact spring seats of the springs. However, the conventional retaining plate requires use of the spring seats, which increases raw material cost.

SUMMARY

An example damper for a torque converter is disclosed. The damper may include an outer spring and an inner spring coaxial with the outer spring; and a retaining plate to retain the outer spring and the inner spring. The retaining plate may include an upper spring guide, a lower spring guide, an outer spring support, and an inner spring support, wherein the upper spring guide extends substantially around an outer periphery of the retaining plate, the lower spring guide extends around an inner periphery of the retaining plate, the outer spring support directly contacts axial ends of the outer spring and the inner spring, and the inner spring support directly contacts the axial ends of the outer spring and the inner spring.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The figures are not to scale. In general, the same reference numbers will be used throughout the drawing(s) and accompanying written description to refer to the same or like parts.

DETAILED DESCRIPTION

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "upper," "lower," "front," "rear," "side," "interior," "exterior," and the like that may be used herein, merely describe points of reference and do not necessarily limit aspects of the disclosed subject matter to any particular orientation or configuration. Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

Figure 1:
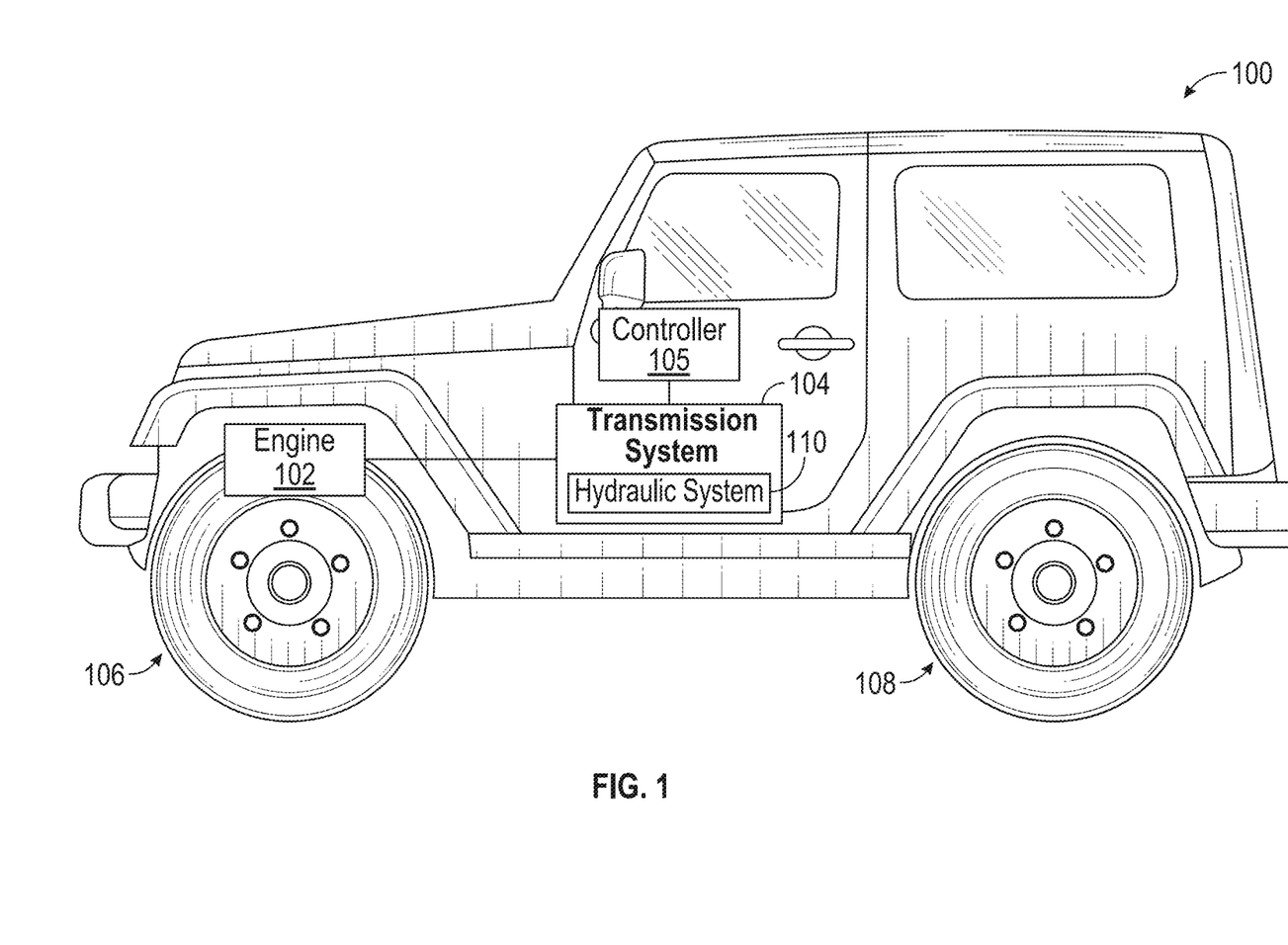
FIG. 1 is a schematic illustration of an example vehicle, in accordance with the teachings of this disclosure.

FIG. 1 is a schematic illustration of an example vehicle (e.g., a motor vehicle such as one of a car, a truck, a van, a sport utility vehicle (SUV), etc.) 100, in accordance with the teachings of this disclosure. According to the illustrated example of FIG. 1, the vehicle 100 includes an engine (e.g., an internal combustion engine) 102, a transmission system 104, a controller 105, and one or more wheels 106, 108 (sometimes referred to as road wheels), two of which are shown in this example, (i.e., a first or front wheel 106 and a second or rear wheel 108).

The transmission system 104 of FIG. 1 can be an automatic transmission including a plurality of gear ratios or a continuously variable transmission. In particular, the transmission system 104 of FIG. 1 is structured and/or configured to transfer torque from the engine 102 to one or more (e.g., all) of the wheel(s) 106, 108, for example, to move the vehicle 100. For example, the engine 102 generates an engine torque and, in response, the transmission system 104 controls an amount or degree of the engine torque that is provided to the wheel(s) 106, 108. In some examples, the transmission system 104 includes a hydraulic system 110 operable by the controller 105, which facilities control of a torque converter clutch while the vehicle 100 is driving. The hydraulic system 110 can be implemented, for example, using a pump and one or more valves (e.g., one or more solenoid valves).

The controller 105 of FIG. 1 can be implemented, for example, using an electronic control unit (ECU) such as a transmission control module (TCM). The vehicle controller 105 is communicatively coupled to the valve(s) of the hydraulic system 110, for example, via a transmission or signal wire, a bus (e.g., a controller area network (CAN) bus), radio frequency, etc. In particular, the controller 105 is configured to direct the hydraulic system 110 to change the state of the torque converter clutch based on a detected condition of the vehicle 100. For example, the vehicle controller 105 causes at least one of the valve(s) to open and/or close when the vehicle 100 is traveling at a relatively high speed. Further, to facilitate detecting such a condition of the vehicle, the controller 105 may be communicatively coupled to one or more sensors of the vehicle 100 to receive sensor data from the sensor(s).

Figure 2:
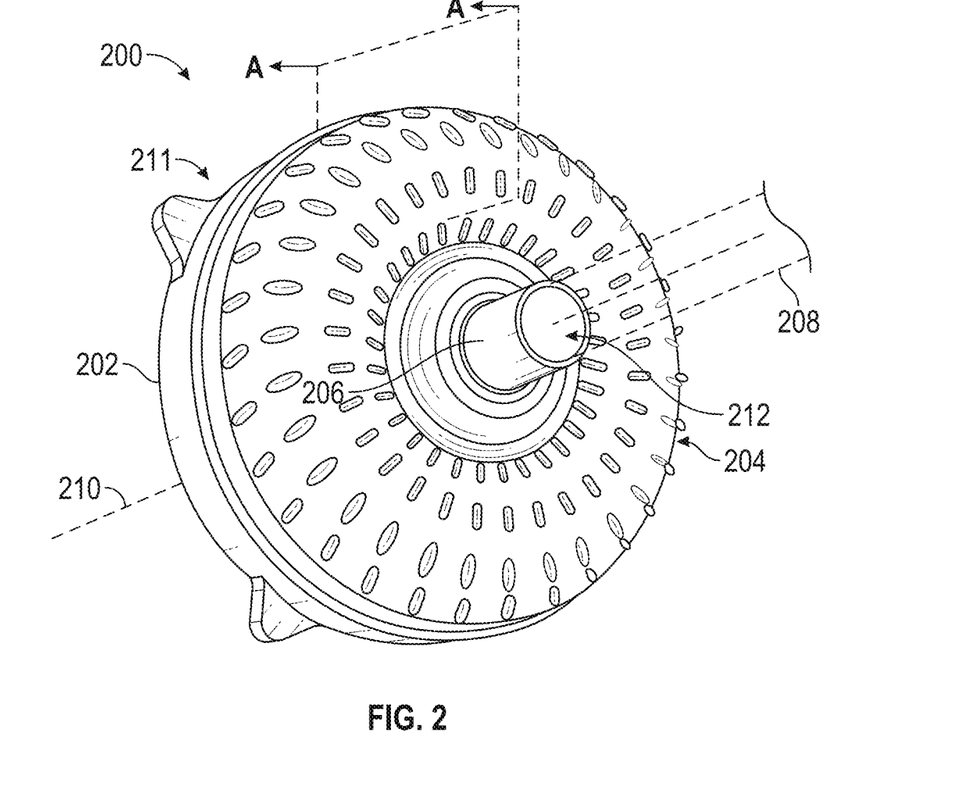
FIG. 2 is a view of an example torque converter, in accordance with the teachings of this disclosure.

FIG. 2 is a view of an example torque converter 200, in accordance with the teachings of this disclosure. In some examples, the torque converter 200 of FIG. 2 is implemented in the vehicle 100 of FIG. 1 to facilitate transferring torque between the engine 102 and the transmission system 104. That is, in such examples, the vehicle 100 of FIG. 1 includes the torque converter 200. In particular, the torque converter 200 of FIG. 2 is configured to operatively couple torque between the engine 102 and the transmission system 104 of the vehicle 100 such that the engine torque is transmittable through the torque converter 200 from the engine 102 to the transmission system 104. According to the illustrated example of FIG. 2, the torque converter 200 includes a cover 202, an impeller 204, and a first hub (e.g. a drive hub) 206.

The torque converter 200 of FIG. 2 is changeable between a first operating mode (e.g., an unlocked or hydraulic operating mode) that is associated with a first operating characteristic of the torque converter 200 and a second operating mode (e.g., a lockup or locked operating mode) that is associated with a second operating characteristic of the torque converter 200 different relative to the first operating characteristic. When the torque converter 200 is in the first operating mode thereof, the torque converter 200 allows for substantial rotational or angular deviation between an output (e.g., a crankshaft) of the engine 102 and a first shaft (e.g., a transmission input shaft) 208 of the transmission system 104, for example, such that a rotational speed of the first shaft 208 is different relative to a rotational speed of the output of the engine 102. As a result, the engine 102 can remain in operation (e.g., the crankshaft of the engine 102 remains rotating) when the vehicle 100 is stopped (e.g., the first shaft 208 is not rotating) without causing the engine 102 to stall or adversely affecting the engine 102 in another manner. Further, in such examples, the torque converter 200 is configured to increase or multiply the engine torque provided to the transmission system 104 and/or the wheel(s) 106, 108 when the vehicle 100 drives at certain speeds (e.g., relatively low speeds).

The cover 202 of FIG. 2, which is sometimes referred to as a torque converter cover, is relatively non-rotatably (i.e., fixedly) coupled to a component (e.g., the crankshaft or a flywheel) associated with the engine 102 to receive the engine torque or output from the engine 102. Such coupling can be achieved, for example, via one or more example fasteners and/or one or more example fastening methods or techniques. That is, the component associated with the engine 102 supports one or more (e.g., all) of the cover 202, the impeller 204, and/or, more generally, the torque converter 200 when the cover 202 and the component of the engine 102 are assembled. In some examples, the torque converter 200 includes a flywheel that is interposed between the cover 202 and the crankshaft. Additionally, the cover 202 is relatively non-rotatably (i.e., fixedly) coupled to the impeller 204 to drive the impeller 204 via the engine torque, for example, via one or more example fasteners and/or one or more example fastening methods or techniques (e.g., welding). That is, the cover 202 and the impeller 204, together, are rotatable relative to a rotational axis 210 associated with the torque converter 200 in the same rotational direction (e.g., clockwise or counterclockwise). Further, the cover 202 and the impeller 204 form and/or define a housing (e.g., a substantially sealed housing) 211 of the torque converter 200 in which one or more torque converter components are disposed.

The impeller 204 of FIG. 2 is structured and/or configured to control a parameter (e.g., a flow rate, a fluid pressure, etc.) of a fluid in the torque converter housing 211 when the impeller 204 rotates relative to the rotational axis 210, for example, via one or more fins, one or more blades, one or more vanes, etc., and/or any other suitable fluid flow control member positioned on the impeller 204. Additionally, the impeller 204 is relatively non-rotatably (i.e., fixedly) coupled to the cover 202 to receive the engine torque therefrom, as previously described. In some examples, in response to the impeller 204 rotating relative to the rotational axis 210 when the torque converter 200 is in the first operating mode thereof, the torque converter 200 generates an output or a torque (sometimes referred to as an output torque) for the transmission system 104, a magnitude of which is based on, for example, any of the engine torque, a speed of the vehicle, torus parameters, parameters of the fluid flow control members, fluid parameters, fluid properties, etc.

The first hub 206 of FIG. 2 is connected to the pump of the hydraulic system 110. In particular, rotation of the first hub 206 relative to the rotational axis 210 causes the pump to change a parameter (e.g., a flow rate, a fluid pressure, etc.) of at least a portion of the fluid, for example, in one of (a) a component (e.g., a gearbox) of the transmission system 104, (b) a fluid path or channel associated with the first shaft 208, (c) the housing 211, or (d) a combination thereof. Additionally, in some examples, the first hub 206 of FIG. 2 is configured to removably receive the first shaft 208 associated with the vehicle transmission system 104 via an aperture 212 defined by the first hub 206. As shown in FIG. 2, the first shaft 208 extends at least partially into the housing 211 through the aperture 212.

The first shaft 208 of FIG. 2 is configured to couple between the torque converter 200 and the component of the transmission system 104. In particular, the first shaft 208 is configured to transfer the output torque from the torque converter 200 to the transmission system 104, thereby driving the wheel(s) 106, 108. In some examples, the first shaft 208 is inserted in the first hub 206 to connect the first shaft 208 to an output portion of the torque converter 200. In such examples, the first shaft 208 and the output portion are relatively non-rotatably (i.e., fixedly) coupled together, for example, via a splined connection.

Figure 3:
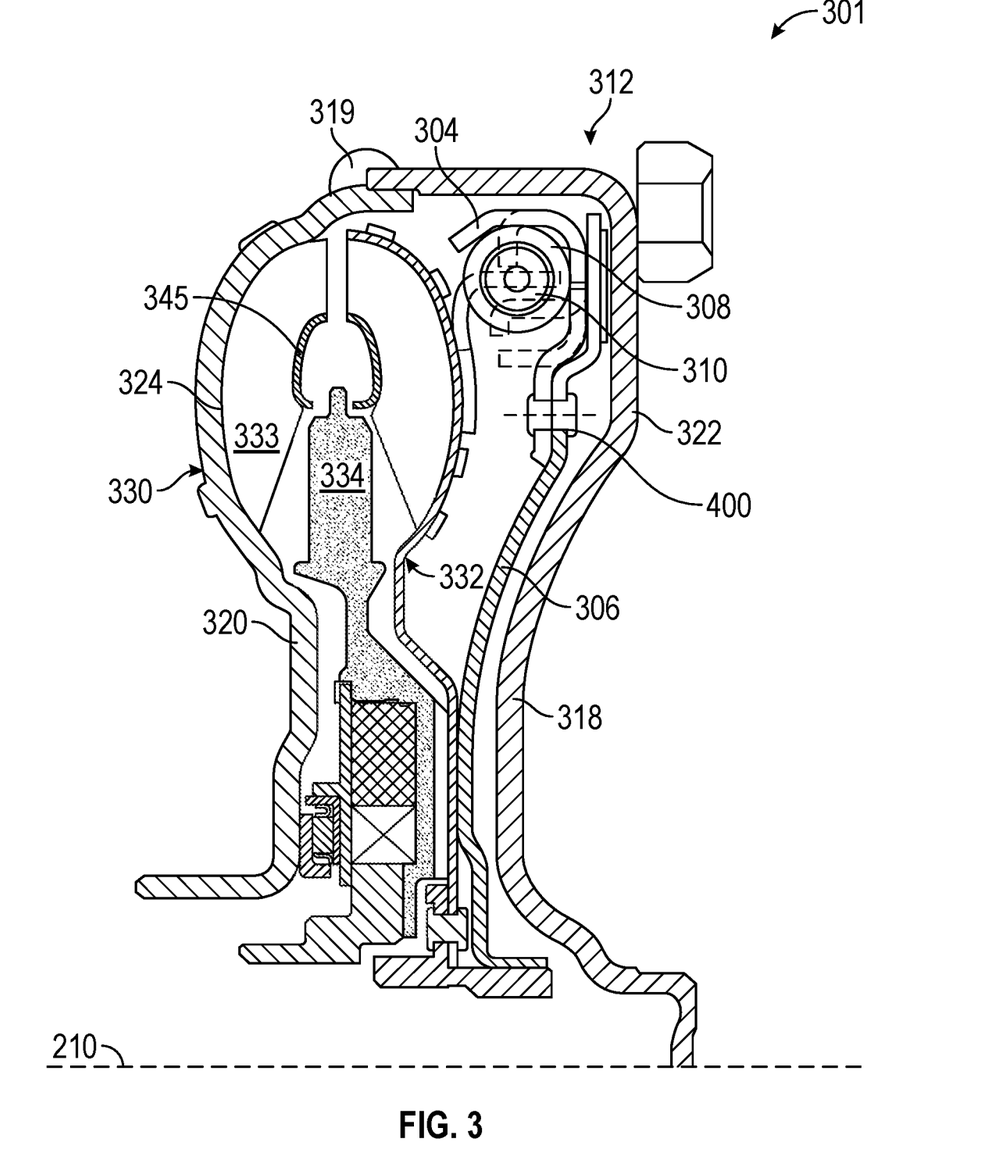
FIG. 3 is a fragmented half-view in axial cross section of a torque converter assembly, in accordance with the teachings of this disclosure.

FIG. 3 is a fragmented half-view in axial cross section of a torque converter assembly 301, in accordance with the teachings of this disclosure. FIG. 3 is also a partial cross section view of the torque converter 200 along line A-A of FIG. 2 and shows the torque converter assembly 301.

The torque converter assembly 301 includes the torque converter 200, a sealed casing 312 filled with a fluid, such as oil or transmission fluid. The sealed casing 312, the torque converter 200 and a damper assembly 306 are all rotatable about a rotational axis 210. The drawings discussed herein show half-views, that is, the cross section of a portion or fragment of the torque converter assembly above the rotational axis 210. Generally, the torque converter assembly 301 is symmetrical about the rotational axis 210. Herein, the axial and radial orientations are considered with respect to the rotational axis 210 of the torque converter assembly 301. The relative ten is such as "axially," "radially," and "circumferentially" are with respect to orientations parallel to, perpendicular to, and circularly around the rotational axis 210, respectively.

The sealed casing 312 illustrated in FIG. 3 includes a first casing shell 318 and a second casing shell 320 fixedly and sealingly connected together, such as by weld 319 at their outer peripheries, and non-movable relative to one another yet rotatable about the rotational axis 210. The first shell 318 is interconnected to and non-movable relative to the driving shaft, more typically a flywheel (not shown) that is fixed to and non-rotatable relative to the driving shaft, so that the casing 312 turns at the same speed that the engine operates. Each of the first and second casing shells 318, 320 may be made, for example, integrally by press-forming one-piece metal sheets.

The first casing shell 318 includes a first sidewall portion 322 extending substantially radially relative to the direction from the rotational axis 210 in a plane that is generally transverse to the rotational axis 210). Similarly, the second casing shell 320 includes a second sidewall portion 324 extending substantially radially relative to the direction from the rotational axis 210.

The torque converter 200 includes an impeller (sometimes referred to as the pump or impeller wheel) 330, a turbine-piston 332, and a stator (sometimes referred to as the reactor) 334 interposed axially between and operatively connecting the impeller 330 and the turbine-piston 332. The impeller 330, the turbine-piston 332, and the stator 334 are coaxially aligned with one another on the rotational axis 210. The impeller 330, the turbine-piston 332, and the stator 334 collectively form a torus. The impeller 330 and the turbine-piston 332 may be fluidly coupled to one another.

The impeller 330 of FIG. 3 is structured and/or configured to control a parameter (e.g., a flow rate, a fluid pressure, etc.) of a fluid in second casing shell 320 when the impeller 330 rotates relative to the rotational axis 210, for example, via one or more fins, one or more blades, one or more vanes, etc., and/or any other suitable fluid flow control member positioned on the impeller 330. Additionally, the impeller 330 is relatively non-rotatably (i.e., fixedly) coupled to the first sidewall portion 322 to receive the engine torque therefrom, as previously described. In some examples, in response to the impeller 330 rotating relative to the rotational axis 210 when the torque converter 200 is in the first operating mode thereof, the torque converter 200 generates an output or a torque (sometimes referred to as an output torque) for the transmission system 104, a magnitude of which is based on, for example, any of the engine torque, a speed of the vehicle, torus parameters, parameters of the fluid flow control members, fluid parameters, fluid properties, etc.

The second casing shell 320 of the casing 312 also forms and serves as the impeller shell of the impeller 330. Accordingly, the impeller shell 320 sometimes is referred to as part of the casing 312. The impeller 330, including its shell 320, the impeller core ring 345, and the impeller blades 333, is secured to the first casing shell 318 so as to be non-rotatable relative to the casing 312 and hence interconnected to the drive shaft (or flywheel) of the engine to rotate at the same speed as the engine output.

In FIG. 3, the stator 334 is positioned between the impeller 330 and the turbine-piston 332 to redirect fluid from the turbine-piston 332 back to the impeller 330 in an efficient manner.

The damper assembly 306 is housed in the casing 312 axially between the turbine-piston 332 and the first casing shell 318, as shown in FIG. 3. The damper assembly 306 may include, but not limited to, a retaining plate 304, outer spring 308, and inner spring 310. The retaining plate 304 may be used to support the outer spring 308 and the inner spring 310. The retaining plate 304 may be made by of high tensile steel such as SAPH 440, or the like.

Figure 4:
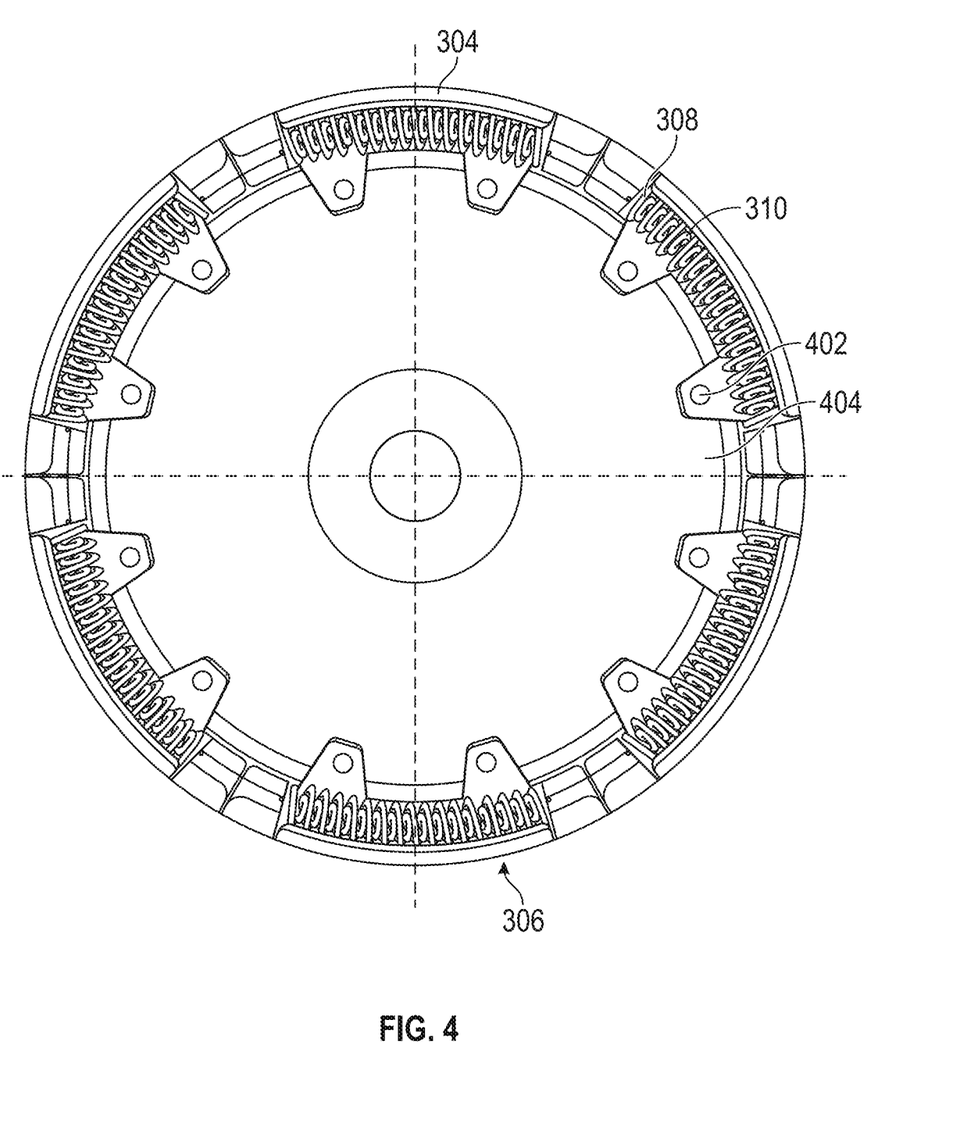
FIG. 4 is a top view of a damper assembly in accordance with the teachings of this disclosure.

FIG. 4 is a top view of a damper assembly 306 in accordance with the teachings of this disclosure.

The damper assembly 306 may include a plurality of the retaining plate 304, the outer spring 308, the inner spring 310, rivet 400, and piston 404. The retaining plate 304 may support the springs including outer spring 308 and the inner spring 310 directly. The retaining plate 304 may extend substantially around the outer spring 308 and the inner spring 310 in order to support the springs of the damper assembly 306. The damper assembly may be attached to the retaining plate 304 by rivets 400. As shown in FIG. 4, when the retaining plate 304 is made into segment type with a plurality of segments, the shape of both ends of the retaining plate 304 may be adjusted to form a shape that can support the springs such as outer spring 308 and inner spring 310.

The damper assembly 306 may include rivet holes 402. The damper assembly 306 may also include piston 404. The piston 404 may be located in the middle of the damper assembly 306. The retaining plate 304 may be riveted to the piston 404 by the rivets 400 through rivet holes 402. The retaining plate 304 may also be welded to the piston 404 instead of riveting.

FIG. 4 is a perspective view of the retaining plate 304 with outer spring 308 and inner spring 310 in accordance with the teachings of this disclosure.

The damper assembly 306 may be a damper structure for absorbing torque vibration coming from the engine side, and the vibration is absorbed through outer spring 308 and inner spring 310. Springs including the outer spring 308 and inner spring 310 may be located in the circumferential direction and the retaining plate 304 may be used to set the position of the springs. The higher the torque coming from the engine side, the higher the capacity of the springs should be. At this time, in order to increase the capacity of springs, inner springs 310 are added inside the outer springs 308 to form a damper structure. Therefore, the inner springs 310 may have a smaller diameter than the outer springs 308.

In an embodiment, the outer and inner spring supports 309 and 311 may be made inside and outside as described above and shown in FIG. 5, and through these, it is possible to support all outer springs 308 and inner springs 310 without a spring seat. Therefore, the outer spring support 309 and inner spring support 311 may be directly support the outer springs 308 and the inner springs 310 without the spring seat as mentioned earlier. The outer spring support 309 is located at both ends of the outer springs 308 and the inner springs 310, and the outer spring support 309 is used to support the outer springs 308 and the inner springs 309 radially outward. The inner spring support 311 is also located at both ends of the outer springs 308 and the inner springs 310 and the inner spring support 311 is used to support the outer springs 308 and the inner springs 310 radially inward. The outer spring support 309 and the inner spring support 311 may attach the both ends of the outer springs 308 and the inner springs 310.

Figure 5:
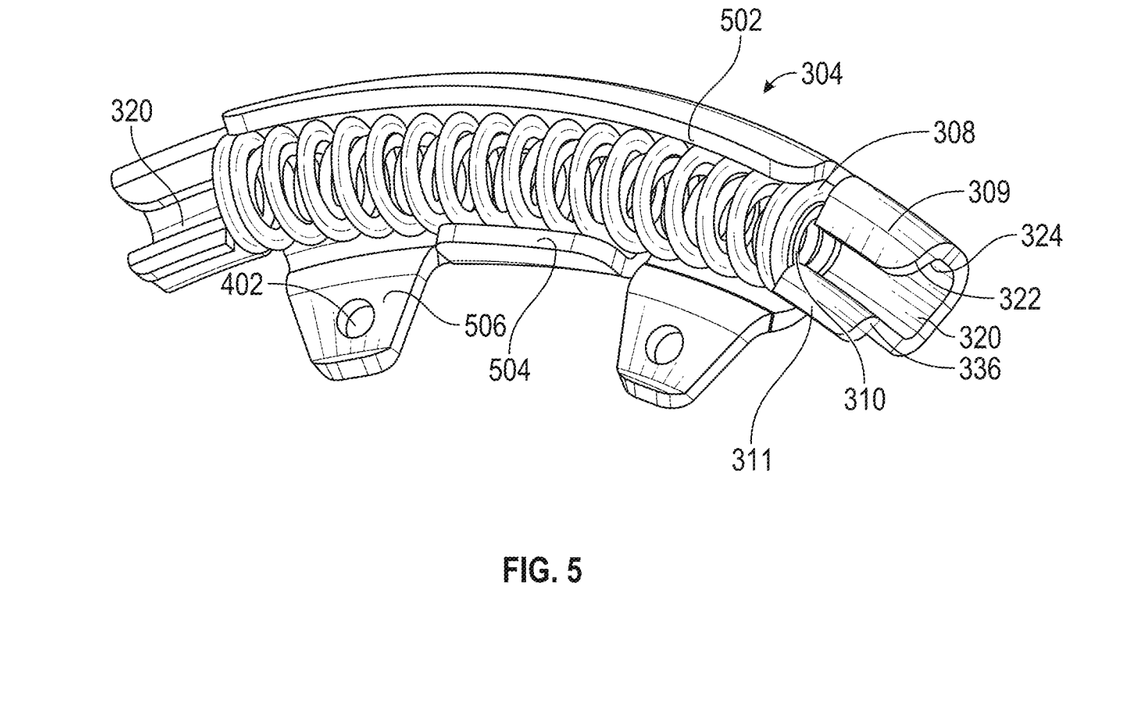
FIG. 5 is a perspective view of a retaining plate with outer springs and inner springs in accordance with the teachings of this disclosure.

In an embodiment, the outer spring supports 309 may extend from ends of the outer springs 308 to edges of the retaining plates 304. The outer spring supports 309 may be located at an outer peripheral of the retaining plates 304.

In an embodiment, the inner spring supports 311 may extend from ends of the inner springs 310 to edges of the retaining plates 304. The inner spring supports 311 may be located at an inner peripheral of the retaining plates 304.

In FIG. 5, an upper spring guide 502 is located at the outer periphery of the retaining plate 304 and a lower spring guide 504 is located at the inner periphery of the retaining plate 304. Tab 506 is a tab for riveting to pistons 404. The upper spring guide 502 extends substantially from an outer periphery of the retaining plate 304 and the lower spring guide 504 is located at a center portion of the retaining plate 304.

In an embodiment, the retaining plate 304 may have a central plate 320. The central plate 320 may contact the outer springs 308. The outer spring support 309 and the inner spring support 311 may be on either side of the central plate 320.

In an embodiment, the upper spring guide 502 may extend substantially from a top of the central plate 320 and the lower spring guide 504 may extend substantially from a bottom of the central plate 320.

In an embodiment, the upper spring guide 502 may extend from one of the outer spring support 309 to another outer spring support of the outer spring support 309. In an embodiment, the tab 506 may be located at the inner peripheral of the retaining plates 304. The rivet holes 402 may be located in the center portion of the tab 506.

In an embodiment, the outer springs 308 and the inner springs 310 are retained by a combination of the central plate 320, the upper spring guide 502, the lower spring guide 504, the outer spring support 309, and the inner spring support 311.

In an embodiment, the outer spring support 309 may have a shape of, but not limited to, a curved trapezoid with a curved angle 322 distal to the outer spring 308. A first side of the trapezoid of the outer spring support 309 that is adjacent to the outer spring 308 may contact the outer spring 308. A second side of the trapezoid connecting to the central plate 320 may be, but not limited to, perpendicular to the first side of the trapezoid. The second side may include a curved structure 324. The outer spring support 309 may directly contact an axial end of the outer spring 308.

In an embodiment, the inner spring support 311 may also have a shape of, but not limited to, a curved trapezoid. The inner spring support 311 may be located on the other side of the central plate 320. The inner spring support 311 may be parallel to the outer spring support 309. The curved trapezoid may have a curved angle 336. The inner spring support 311 may directly contact an axial end of the inner spring 310.

Figure 6:
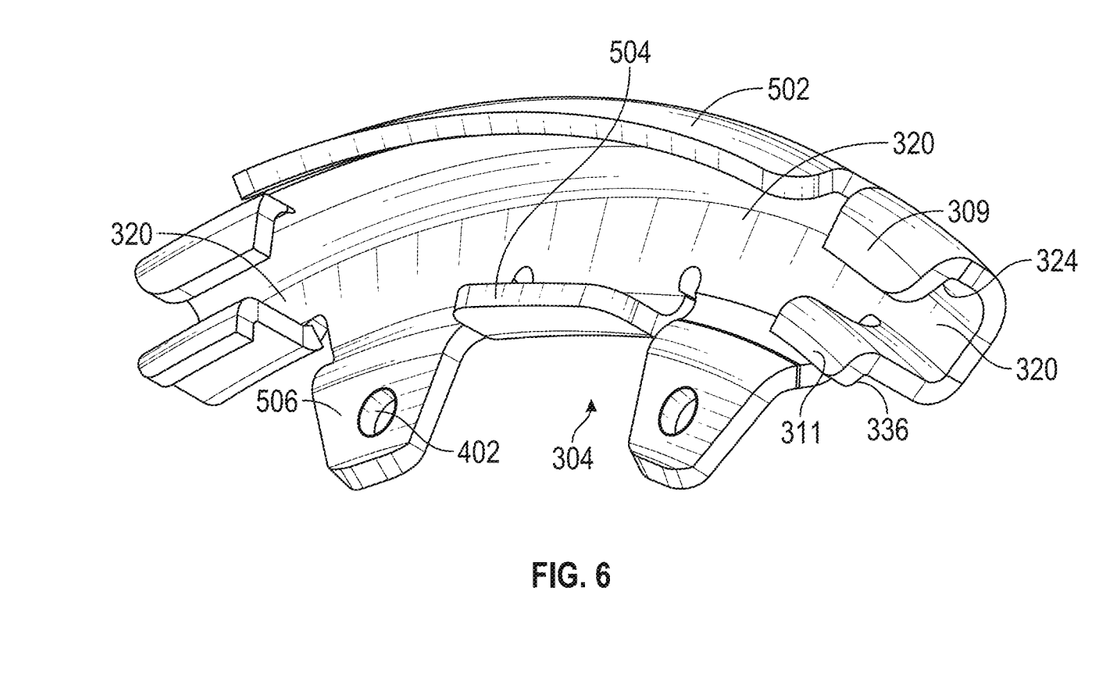
FIG. 6 is a perspective view of a retaining plate in accordance with the teachings of this disclosure.

FIG. 6 is a perspective view of the retaining plate 304 in accordance with the teachings of this disclosure.

In FIG. 6, the retaining plate 304 without the outer springs 308 and the inner springs 310 are shown. As mentioned earlier, the outer spring support 309 and the inner spring support 311 are located at both ends of the retaining plate 304. Each damper assembly 306 may, but not limited to, include six retaining plates 304. Two rivet holes 402 on each retaining plate 304 may be used to attach the retaining plate 304 to the piston 404 via rivets 400 shown earlier in FIG. 3.

Figure 7:
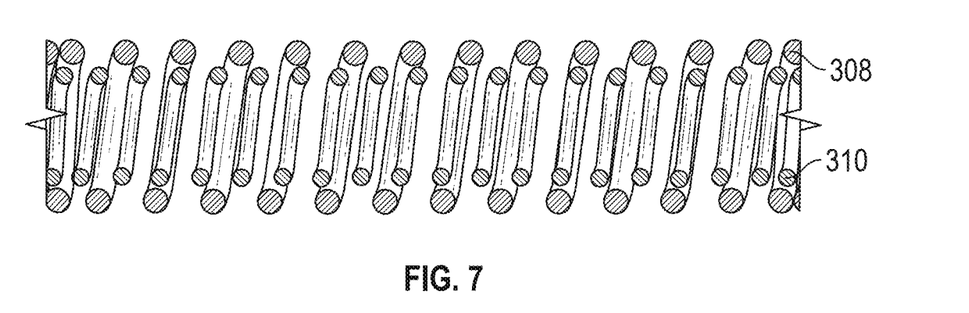
FIG. 7 is a perspective view of outer springs and inner springs in accordance with the teachings of this disclosure.

FIG. 7 is a perspective view of the outer springs 308 and the inner springs 310 in accordance with the teachings of this disclosure.

In an embodiment, the diameter of the inner springs 310 may be smaller than the diameter of the outer springs 308. The length of the inner springs 310 may be similar to the length of the outer springs 308. The length of the outer springs 308 may be the same as the length of the inner springs 310.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A damper for a torque converter, the damper comprising:
    an outer spring and an inner spring coaxial with the outer spring; and
    a retaining plate to retain the outer spring and the inner spring, the retaining plate including an upper spring guide, a lower spring guide, at least one outer spring support, and at least one inner spring support, wherein
    the upper spring guide extends circumferentially at a radially outer periphery of the retaining plate,
    the lower spring guide extends circumferentially at a radially inner periphery of the retaining plate,
    the at least one outer spring support has a U-shape that directly contacts axial ends of the outer spring and the inner spring, and
    the at least one inner spring support directly contacts the axial ends of the outer spring and the inner spring.

2. The damper of claim 1, wherein
    the at least one outer spring support includes a first outer spring support that extends from an outer peripheral edge of the retaining plate to a first end of the axial ends of the outer spring and the inner spring, and
    the at least one outer spring support includes a second outer spring support that extends from the outer peripheral edge of the retaining plate to a second end of the axial ends of the outer spring and the inner spring.

3. The damper of claim 2, wherein the outer spring support extends from the outer peripheral edge of the retaining plate.

4. The damper of claim 2, wherein
    the at least one inner spring support includes a first inner spring support that extends from an inner peripheral edge of the retaining plate to a first end of the axial ends of the outer spring and the inner spring, and the at least one inner spring support includes a second inner spring support that extends from the inner peripheral edge of the retaining plate to a second end of the axial ends of the outer spring and the inner spring.

5. The damper of claim 4, wherein the lower spring guide extends from the inner peripheral edge of the retaining plate.

6. The damper of claim 2, wherein the upper spring guide extends from the outer peripheral edge of the retaining plate between the first outer spring support and the second outer spring support.

7. The damper of claim 1, further comprises a tab extending from an inner peripheral edge of the retaining plate.

8. The damper of claim 1, wherein a circumferential end of the U-shape of the at least one outer spring support directly contacts the axial ends of the outer spring and the inner spring.

9. The damper of claim 8, wherein the circumferential end of the U-shape of the at least one outer spring support does not contact an entire circumference of the axial ends of the outer spring and the inner spring.

* * * * *